(12) United States Patent
Bell et al.

(10) Patent No.: US 9,051,523 B2
(45) Date of Patent: Jun. 9, 2015

(54) APPARATUS AND PROCESS FOR GASIFICATION OF CARBONACEOUS MATERIALS TO PRODUCE SYNGAS

(75) Inventors: Peter S. Bell, Fayetteville, AR (US); Ching-Whan Ko, Fayetteville, AR (US); Sean Slape, Fayetteville, AR (US); Scott Breshears, Fayetteville, AR (US); Kim Ocfemia, Fayetteville, AR (US)

(73) Assignee: INEOS BIO SA, Rolle (CH)

( * ) Notice: Subject to any disclaimer, the term of this patent is extended or adjusted under 35 U.S.C. 154(b) by 93 days.

(21) Appl. No.: 13/427,144

(22) Filed: Mar. 22, 2012

(65) Prior Publication Data

US 2012/0256129 A1    Oct. 11, 2012

Related U.S. Application Data

(60) Provisional application No. 61/516,646, filed on Apr. 6, 2011, provisional application No. 61/516,704, filed on Apr. 6, 2011, provisional application No. 61/516,667, filed on Apr. 6, 2011.

(51) Int. Cl.
*C01B 3/02* (2006.01)
*C10K 3/00* (2006.01)
(Continued)

(52) U.S. Cl.
CPC ............ *C10K 3/008* (2013.01); *C01B 2203/143* (2013.01); *C01B 2203/142* (2013.01); *C01B 2203/0877* (2013.01);
(Continued)

(58) Field of Classification Search
USPC ........................................................ 252/373
See application file for complete search history.

(56) References Cited

U.S. PATENT DOCUMENTS

| 3,980,592 A | 9/1976 | Marion |
| 4,017,271 A | 4/1977 | Barclay et al. |

(Continued)

FOREIGN PATENT DOCUMENTS

| DE | 102008027858 | 12/2009 |
| EP | 1918352 | 11/2006 |

(Continued)

OTHER PUBLICATIONS

International Search Report for PCT/US2012/032160, dated Aug. 30, 2012 (4 pgs.).

(Continued)

*Primary Examiner* — Wayne Langel
(74) *Attorney, Agent, or Firm* — Ineos USA LLC (57) ABSTRACT

A process and apparatus are provided for gasification of a carbonaceous material. The process produces a raw syngas that can be further processed in a tar destruction zone to provide a hot syngas. The process includes contacting said carbonaceous material with molecular oxygen-containing gas in a gasification zone to gasify a portion of said carbonaceous material and to produce a first gaseous product. A remaining portion of the carbonaceous material is contacted with molecular oxygen-containing gas in a burn-up zone to gasify additional portion of the carbonaceous material and to produce a second gaseous product and a solid ash. The first gaseous product and said second gaseous product are combined to produce a raw syngas that includes carbon monoxide (CO), carbon dioxide ($CO_2$) and tar. The raw syngas is contacted with molecular oxygen containing gas in a tar destruction zone to produce said hot syngas.

32 Claims, 4 Drawing Sheets

(51) Int. Cl.
*C10J 3/84* (2006.01)
*C10J 3/86* (2006.01)
*C10J 3/72* (2006.01)
*C10K 1/04* (2006.01)
*F22B 1/18* (2006.01)
*C10K 1/02* (2006.01)

(52) U.S. Cl.
CPC .......... C01B 2203/0894 (2013.01); *C10J 3/84* (2013.01); *C10J 3/86* (2013.01); *C10J 2300/1884* (2013.01); *C10K 3/005* (2013.01); *C10J 3/723* (2013.01); *C10J 3/726* (2013.01); *C10J 2300/0956* (2013.01); *C10J 2300/0959* (2013.01); *Y02E 50/17* (2013.01); *Y02E 50/32* (2013.01); *Y02E 50/343* (2013.01); *C10K 1/04* (2013.01); *C10J 3/721* (2013.01); *C10J 2300/1606* (2013.01); *C10J 2300/1846* (2013.01); *F22B 1/1838* (2013.01); *C10J 3/72* (2013.01); *Y02T 10/16* (2013.01); *C10K 1/02* (2013.01); *C10K 3/003* (2013.01); *Y02E 60/324* (2013.01)

(56) References Cited

U.S. PATENT DOCUMENTS

| | | | |
|---|---|---|---|
| 4,238,403 A | 12/1980 | Pinto | |
| 4,347,064 A * | 8/1982 | Reh et al. | 48/197 R |
| 4,805,562 A | 2/1989 | Davis et al. | |
| 4,823,741 A | 4/1989 | Davis | |
| 5,145,491 A | 9/1992 | Schmitt et al. | |
| 6,033,447 A | 3/2000 | Moock et al. | |
| 7,285,402 B2 | 10/2007 | Gaddy | |
| 7,923,476 B2 | 4/2011 | Young | |
| 7,932,298 B2 | 4/2011 | Young | |
| 8,021,577 B2 * | 9/2011 | Johnson et al. | 252/373 |
| 8,192,647 B2 * | 6/2012 | Chornet et al. | 252/373 |
| 8,252,073 B2 * | 8/2012 | Tsang et al. | 48/202 |
| 8,580,152 B2 * | 11/2013 | Sutradhar et al. | 252/373 |
| 8,585,789 B2 * | 11/2013 | Sutradhar et al. | 48/197 R |
| 8,691,115 B2 * | 4/2014 | Schubert | 252/373 |
| 2005/0095183 A1* | 5/2005 | Rehmat et al. | 422/188 |
| 2007/0266634 A1 | 11/2007 | Tsangaris | |
| 2008/0115415 A1 | 5/2008 | Agrawal et al. | |
| 2008/0169449 A1 | 7/2008 | Mundschau | |
| 2008/0209807 A1 | 9/2008 | Tsangaris | |
| 2008/0210089 A1 | 9/2008 | Tsangaris | |
| 2008/0244976 A1 | 10/2008 | Paisley | |
| 2008/0280236 A1 | 11/2008 | Wright | |
| 2009/0018221 A1 | 1/2009 | Klepper | |
| 2009/0018222 A1 | 1/2009 | Klepper | |
| 2009/0064581 A1 | 3/2009 | Nielsen et al. | |
| 2009/0090053 A1 | 4/2009 | Feldmann | |
| 2009/0156695 A1 | 6/2009 | Young | |
| 2009/0260286 A1 | 10/2009 | Sasauchi et al. | |
| 2010/0044643 A1 | 2/2010 | Wallace | |
| 2010/0180503 A1 | 7/2010 | Yokohama et al. | |
| 2010/0224835 A1 | 9/2010 | Chornet et al. | |
| 2010/0256246 A1 | 10/2010 | Carryer | |
| 2010/0270505 A1* | 10/2010 | Gallaspy et al. | 252/373 |
| 2010/0317077 A1 | 12/2010 | Gaddy et al. | |
| 2011/0210292 A1* | 9/2011 | Ariyapadi et al. | 252/373 |
| 2011/0248218 A1 | 10/2011 | Sutradhar | |
| 2011/0250661 A1 | 10/2011 | Sutradhar | |
| 2011/0250662 A1 | 10/2011 | Sutradhar | |
| 2013/0099168 A1* | 4/2013 | Ji | 252/373 |

FOREIGN PATENT DOCUMENTS

| | | |
|---|---|---|
| WO | 9318341 | 9/1993 |
| WO | 2006/123018 | 11/2006 |
| WO | WO 2007/048058 A2 | 4/2007 |
| WO | 2007112101 | 10/2007 |
| WO | 2007117157 | 10/2007 |
| WO | 2007131241 | 11/2007 |
| WO | 2008098311 | 8/2008 |
| WO | WO 2009/023364 A2 | 2/2009 |
| WO | 2009076138 | 6/2009 |
| WO | 2009112334 | 9/2009 |
| WO | WO 2009/106357 A2 | 9/2009 |
| WO | 2009154788 | 12/2009 |
| WO | WO 2009/155697 A1 | 12/2009 |

OTHER PUBLICATIONS

International Search Report for PCT/US2012/032168, dated Apr. 16, 2012 (3 pgs.).
International Serach Report for PCT/US2012/032174, dated Aug. 20, 2012, (3 pgs.).
Co-pending U.S. Appl. No. 13/427,193, filed Mar. 22, 2012.
Co-pending U.S. Appl. No. 13/427,247, filed Mar. 22, 2012.
Co-pending U.S. Appl. No. 13/324,299, filed Dec. 13, 2011.
Co-pending U.S. Appl. No. 13/324,321, filed Dec. 13, 2011.
Written Opinion of the International Searching Authority; PCT/US2012/032006; International Filing Date Mar. 4, 2012; 12 pages.
Written Opinion of the International Searching Authority; PCT/US2012/032180; International Filing Date Apr. 4, 2012; 10 pages.

* cited by examiner

APPARATUS AND PROCESS FOR GASIFICATION OF CARBONACEOUS MATERIALS TO PRODUCE SYNGAS

This application claims the benefit of U.S. Provisional Application Nos. 61/516,646, 61/516,704 and 61/516,667 all filed Apr. 6, 2011, all of which are incorporated in their entirety herein by reference.

An apparatus and process is provided for gasification of carbonaceous materials to produce producer gas or synthesis gas or syngas that includes carbon monoxide and hydrogen.

BACKGROUND

Gasification of carbonaceous materials to produce producer gas or synthesis gas or syngas comprising carbon monoxide and hydrogen is well known in the art. Typically, such a gasification process involves a partial oxidation or starved-air oxidation of carbonaceous material in which a sub-stoichiometric amount of oxygen is supplied to the gasification process to promote production of carbon monoxide as described in WO 2009/154788. As described in WO 2009/154788, a gasification process can further be influenced by addition of one or more of steam and carbon dioxide ($CO_2$). Success of a gasification process greatly depends on quality of syngas produced. Increased content of carbon monoxide (CO) and hydrogen ($H_2$) is desirable in syngas produced. In other words, contents of diluents such as carbon dioxide ($CO_2$), nitrogen ($N_2$) should be as low as possible especially for use of product syngas for heating value or for producing chemicals.

Various mineral matters often form part of carbonaceous materials. While the hydro-carbonaceous part of carbonaceous materials converts to CO, $CO_2$ and $H_2$, the mineral matters get separated from the hydro-carbonaceous part and together with any unconverted carbonaceous material or unconverted carbon form ash. The amount and composition of ash (e.g. carbon content) can have an impact on the smooth running of the gasifier as well as on the disposal of ash. Melting and agglomeration of ash in the gasifier may cause slagging and clinker formation that can lead to partial or complete blocking of gasifier. It is, therefore, advantageous to have a gasification process that avoids the melting of ash. It is also advantageous to have a low content of unburned fuel or carbon in ash.

James T. Cobb, Jr. ("Production of Synthesis Gas by Biomass Gasification," James T. Cobb, Jr., Proceedings of the 2007 Spring National AIChE Meeting, Houston, Tex., Apr. 22-26, 2007) describes a Consutech Gasifier (BRI Energy LLC), the first stage of which is a standard step-grate combustor (frequently used as an MSW incinerator) that operates as a gasifier at 950° F. using oxygen-enriched air. The second stage is a heat treater that operates at 2000-2250° F. and uses minimal oxygen to crack tars.

WO 2009/154788 describes a two stage gasifier in which carbonaceous material is fed to the first stage in which air, oxygen-enriched air or pure oxygen can be injected at a controlled rate. The first stage temperature and oxygen input is controlled such that only partial oxidation of carbonaceous material occurs. The gaseous product from the first stage moves to the second stage. Ash is removed from the first stage. Pure oxygen is introduced into the second stage in order to accomplish cracking and partial oxidation of any tar contained in the gaseous stream from the first stage.

A two stage gasifier such as that described in WO 2009/154788 can be effective in producing syngas from various waste carbonaceous materials and good quality syngas can be produced, however, a high carbon content is generally observed in ash produced from this gasification process.

SUMMARY

A process and apparatus are provided for gasification of a carbonaceous material. The process produces a raw syngas that can be further processed in a tar destruction zone to provide a hot syngas. The hot syngas has a molar ratio of $CO/CO_2$ in the hot syngas is greater than about 0.75 and a ratio of carbon content of solid ash to carbon content of carbonaceous material feed is less than about 0.1. The carbon content of the solid ash is less than about 10%.

A process is provided for gasification of a carbonaceous material to produce a raw syngas. The process includes contacting said carbonaceous material with a first molecular oxygen-containing gas and optionally with one or more of steam and $CO_2$ in a gasification zone to gasify a portion of said carbonaceous material and to produce a first gaseous product. A remaining portion of the carbonaceous material is contacted with a second molecular oxygen-containing gas and optionally with one or more of steam and $CO_2$ in a burn-up zone to gasify an additional portion of said carbonaceous material and to produce a second gaseous product and a solid ash comprising carbon. The first gaseous product and second gaseous product are combined to produce the raw syngas. The raw syngas has a $CO/CO_2$ molar ratio greater than about 0.75 and ratio of carbon content of solid ash to carbon content of carbonaceous material feed less than about 0.1. The carbon content of the solid ash is less than about 10%.

In another aspect, the mass of total oxygen per unit mass of total carbon in carbonaceous material feed entering gasification zone is less than mass of total oxygen per unit mass of total carbon in an unconverted portion of carbonaceous material feed entering burn-up zone. The gasification zone may include one or more gasification hearths and the burn-up zone may include one or more burn-up hearths. One or more of said gasification hearths accomplish preheating of the carbonaceous material by heat exchange with one or more of said first gaseous product and second gaseous product.

In another aspect, a ratio of total amount of molecular oxygen contained in the first molecular oxygen containing gas and the second molecular oxygen containing gas to the total amount of molecular oxygen required to completely oxidize all carbon contained in carbonaceous material feed to carbon dioxide is in a range of 0.1 to 0.9. In accordance with the process, molecular oxygen is introduced into the gasification zone and burn-up zone at a rate of about 0 to about 75 lb-mole per tone of carbonaceous material on a dry basis. The temperature of the gasification zone and burn-up zone is not greater than 800° C.

In another aspect, a process for gasification of a carbonaceous material to produce a hot syngas. The process includes contacting said carbonaceous material with a first molecular oxygen-containing gas and optionally with one or more of steam and $CO_2$ in a gasification zone to gasify a portion of said carbonaceous material and to produce a first gaseous product. A remaining portion of the carbonaceous material is contacted with a second molecular oxygen-containing gas and optionally with one or more of steam and $CO_2$ in a burn-up zone to gasify additional portion of the carbonaceous material and to produce a second gaseous product and a solid ash comprising carbon. The first gaseous product and said second gaseous product are combined to produce a raw syngas that includes carbon monoxide (CO), carbon dioxide ($CO_2$) and tar. The raw syngas has a $CO/CO_2$ molar ratio greater than about 0.75. The raw syngas is contacted with a third molecular oxygen containing gas in a tar destruction zone to produce said hot syngas. The tar destruction zone has temperature greater than about 900° C. The molar ratio of $CO/CO_2$ in the hot syngas is greater than about 0.75 and a ratio of carbon content of solid ash to carbon content of carbonaceous material feed is less than about 0.1. The carbon content of the solid ash is less than about 10 weight %.

A gasification apparatus is provided that includes a gasification zone that includes one or more hearths; a burn-up zone continuous with the gasification zone, the burn-up zone including one or more hearths, wherein the gasification and burn-up zones are effective for providing a raw syngas having a $CO/CO_2$ molar ratio greater than about 0.75 and ratio of carbon content of solid ash to carbon content of carbonaceous material feed is less than about 0.1; and a tar destruction zone effective for receiving the raw syngas from the gasification and burn-up zones through a connecting zone. In one aspect, the gasification zone includes up to 10 hearths. In one aspect, the burn-up zone includes up to 5 hearths. In another aspect, the gasification apparatus includes at least one solids transfer device effective for moving carbonaceous material from the gasification zone to the burn-up zone. The gasification apparatus may also include at least one gas inlet in the gasification zone, burn-up zone and tar destruction zone.

BRIEF DESCRIPTION OF FIGURES

The above and other aspects, features and advantages of several aspects of the process will be more apparent from the following drawings.

Referring now to FIG. 1, the gasification-apparatus (10) includes a gasification zone (103) and a burn-up zone (200). The gasification zone includes one inlet for adding gas (e.g., oxygen containing gas, steam, carbon dioxide): inlet 102; the burn-up zone includes one inlet for adding gas: inlet 202. A carbonaceous material feed (101) can be added into the gasification zone (103). A stream of solid ash (205) can be removed from burn-up zone (200). A stream of raw syngas (105) can be removed from the gasification zone (103).

Referring now to FIG. 2, the gasification-apparatus (11) includes a gasification zone (113) and a burn-up zone (230). The gasification zone (113) includes four gasification hearths: Hearth-I (310), Hearth-II (320), Hearth-III (330), and Hearth-IV (340). Each gasification hearth includes one inlet for adding gas: gas inlet 111 to Hearth-I, gas inlet 121 to Hearth-II, gas inlet 131 to Hearth-III, and gas inlet 141 to Hearth-IV. The burn-up zone includes one inlet for adding gas: gas inlet 202. A carbonaceous material feed (101) can be added into Hearth-I (entry hearth) of the gasification zone (113). A stream of solid ash (205) can be removed from the burn-up zone (230). A stream of raw syngas (105) can be removed from the gasification zone (113).

Referring now to FIG. 3, the gasification-apparatus (12) includes a gasification zone (123) and a burn-up zone (232). The gasification zone (123) includes four gasification hearths: Hearth-I (410), Hearth-II (420), Hearth-III (430), and Hearth-IV (440). Each gasification hearth includes one inlet for adding gas: gas inlet 411 to Hearth-I, gas inlet 421 to Hearth-II, gas inlet 431 to Hearth-III, and gas inlet 441 to Hearth-IV. The burn-up zone includes two burn-up hearths: Hearth-V (416), Hearth-VI (220). Each burn-up hearth includes one inlet for adding gas: gas inlet 511 to Hearth-V, and gas inlet 521 to Hearth-VI. A carbonaceous material feed (101) can be added into Hearth-I (entry hearth) of the gasification zone (123). A stream of solid ash (205) can be removed from Hearth-VI (exit hearth) of the burn-up zone (232). A stream of raw syngas (105) can be removed from the gasification zone (123).

Referring now to FIG. 4, the gasification-apparatus (13) includes a gasification zone (143), a burn-up zone (500), a connecting zone or throat (300) and a tar reduction zone (400). The gasification zone (143) includes five gasification hearths: Hearth-I (110), Hearth-II (120), Hearth-III (130), Hearth-IV (140), and Hearth-V (150). Each gasification hearth includes one inlet for adding gas: gas inlet 611 to Hearth-I, gas inlet 621 to Hearth-II, gas inlet 631 to Hearth-III, gas inlet 641 to Hearth-IV and gas inlet 651 to Hearth-V. The burn-up zone includes one inlet for adding gas: gas inlet 202. The connecting zone or throat (300) includes one inlet for adding gas: gas inlet 301. A carbonaceous material feed (101) can be added into Hearth-I (entry hearth) of the gasification zone (143). A stream of solid ash (205) can be removed from the burn-up zone (500). A stream of hot syngas (405) can be removed from the tar reduction zone (400).

Corresponding reference characters indicate corresponding components throughout the several views of the drawings. Skilled artisans will appreciate that elements in the figures are illustrated for simplicity and clarity and have not necessarily been drawn to scale. For example, the dimensions of some of the elements in the figures may be exaggerated relative to other elements to help to improve understanding of various aspects of the present process and apparatus. Also, common but well-understood elements that are useful or necessary in commercially feasible aspects are often not depicted in order to facilitate a less obstructed view of these various aspects.

DETAILED DESCRIPTION

Definitions

Unless otherwise defined, the following terms as used throughout this specification for the present disclosure are defined as follows and can include either the singular or plural forms of definitions below defined:

The term "about" modifying any amount refers to the variation in that amount encountered in real world conditions, e.g., in the lab, pilot plant, or production facility. For example, an amount of an ingredient or measurement employed in a mixture or quantity when modified by "about" includes the variation and degree of care typically employed in measuring in an experimental condition in production plant or lab. For example, the amount of a component of a product when modified by "about" includes the variation between batches in a multiple experiments in the plant or lab and the variation inherent in the analytical method. Whether or not modified by "about," the amounts include equivalents to those amounts. Any quantity stated herein and modified by "about" can also be employed in the present disclosure as the amount not modified by "about".

"Carbonaceous material" as used herein refers to carbon rich material such as coal, and petrochemicals. However, in this specification, carbonaceous material includes any carbon material whether in solid, liquid, gas, or plasma state. Among the numerous items that can be considered carbonaceous material, the present disclosure contemplates: carbonaceous material, carbonaceous liquid product, carbonaceous industrial liquid recycle, carbonaceous municipal solid waste (MSW or msw), carbonaceous urban waste, carbonaceous agricultural material, carbonaceous forestry material, carbonaceous wood waste, carbonaceous construction material, carbonaceous vegetative material, carbonaceous industrial waste, carbonaceous fermentation waste, carbonaceous petrochemical coproducts, carbonaceous alcohol production coproducts, carbonaceous coal, tires, plastics, waste plastic, coke oven tar, fibersoft, lignin, black liquor, polymers, waste polymers, polyethylene terephthalate (PETA), polystyrene (PS), sewage sludge, animal waste, crop residues, energy crops, forest processing residues, wood processing residues, livestock wastes, poultry wastes, food processing residues, fermentative process wastes, ethanol coproducts, spent grain, spent microorganisms, or their combinations.

The term "fibersoft" or "Fibersoft" or "fibrosoft" or "fibrousoft" means a type of carbonaceous material that is produced as a result of softening and concentration of various substances; in an example carbonaceous material is produced via steam autoclaving of various substances. In another example, the fibersoft can include steam autoclaving of municipal, industrial, commercial, medical waste resulting in a fibrous mushy material.

The term "municipal solid waste" or "MSW" or "msw" means waste comprising household, commercial, industrial and/or residual waste.

The term "syngas" or "synthesis gas" means synthesis gas which is the name given to a gas mixture that contains varying amounts of carbon monoxide and hydrogen. Examples of production methods include steam reforming of natural gas or hydrocarbons to produce hydrogen, the gasification of coal and in some types of waste-to-energy gasification facilities. The name comes from their use as intermediates in creating synthetic natural gas (SNG) and for producing ammonia or methanol. Syngas includes use as an intermediate in producing synthetic petroleum for use as a fuel or lubricant via Fischer-Tropsch synthesis and previously the Mobil methanol to gasoline process. Syngas consists primarily of hydrogen, carbon monoxide, and some carbon dioxide, and has less than half the energy density (i.e., BTU content) of natural gas. Syngas is combustible and often used as a fuel source or as an intermediate for the production of other chemicals.

"Ton" or "ton" refers to U.S. short ton, i.e. about 907.2 kg (2000 lbs).

As used herein, the term "tar" includes, without limitation, a gaseous tar, a liquid tar, a solid tar, a tar-forming substances, or mixtures thereof, which generally comprise hydrocarbons and derivatives thereof. A large number of well known tar measurement methods exist that may be utilized to measure tar. One large family of techniques includes analytical methods based on liquid or gas phase chromatography coupled with a detector. The most frequent detectors in the case of measurement of tars are the flame-ionization detector (FID) and the mass spectrometer. Another family of techniques includes spectrometric methods, which include detecting and analyzing a spectrum. This is for example infrared, ultraviolet (UV) or luminescence spectrometry, and LIBS (Laser-Induced Breakdown Spectroscopy) technique. Another technique for monitoring of combustion gases is FTIR (Fourier Transform InfraRed) infrared spectrometry. Miscellaneous documents mention this technique, such as for example WO2006015660, WO03060480 and U.S. Pat. No. 5,984,998.

There exist other known electronic methods which allow continuous monitoring of tars. These techniques include detectors with electrochemical cells and sensors with semiconductors. Various gravimetric techniques may also be utilized for tar measurements. In one aspect, the amount of tar may be expressed as equivalent ppm of carbon. In this aspect, the hydrocarbon may be benzene or an alcohol, such as methanol. In this aspect, reducing content of tar may mean a tar concentration equivalent or tar equivalents corresponding to less than about 10 ppm benzene.

DETAILED DESCRIPTION

The following description is not to be taken in a limiting sense, but is made merely for the purpose of describing the general principles of exemplary embodiments. The scope of the invention should be determined with reference to the claims.

A processes and apparatus is provided for gasification of carbonaceous material to produce syngas. In the process, a gasification-apparatus is used for gasification of a carbonaceous material. The gasification-apparatus includes a gasification zone and a burn-up zone. A carbonaceous material feed is introduced in the gasification zone of the gasification-apparatus. A first molecular oxygen containing gas is supplied to the gasification zone and thus the carbonaceous material feed is treated with molecular oxygen in order to initiate and facilitate chemical transformation of carbonaceous material. A portion of the carbonaceous material feed is gasified in the gasification zone to produce a first gaseous product. Supply of oxygen into the gasification-apparatus and especially into the gasification zone is controlled in order to preferentially promote formation of carbon monoxide from carbonaceous material. A sub-stoichiometric amount of oxygen is supplied in order to promote production of carbon monoxide. This action causes incomplete conversion of carbonaceous material in the gasification zone; only a portion of carbonaceous material is gasified in the gasification zone. The remaining portion of carbonaceous material is transferred to the burn-up zone. A second molecular oxygen containing gas is supplied to the burn-up zone and thus the remaining portion of carbonaceous material is treated with molecular oxygen in order to facilitate chemical transformation of unconverted portion of carbonaceous material into gaseous components. An additional portion of said carbonaceous material is thus gasified in the burn-up zone to produce a second gaseous product. The first gaseous product and the second gaseous product are combined to form a raw syngas.

In one aspect the gasification zone and burn-up zone are physically separate units. In one aspect the gasification zone and burn-up zone are parts of one single unit. The gasification zone may be any gasification equipment disclosed in prior art such as and not limited to moving bed, fixed bed, fluidized bed, entrained flow, counter-current ("up draft"), co-current ("down draft"), counter-current fixed bed, co-current fixed bed, counter-current moving bed, co-current moving bed cross draft, hybrid, cross flow, cross flow moving bed, or a part thereof. The burn-up zone may be any gasification equipment disclosed in prior art such as and not limited to moving bed, fixed bed, fluidized bed, entrained flow, counter-current ("up draft"), co-current ("down draft"), counter-current fixed bed, co-current fixed bed, counter-current moving bed, co-current moving bed cross draft, hybrid, cross flow, cross flow moving bed, or a part thereof. In one aspect flow of solid is downward and flow of gas is upward in at least a part of the burn-up zone. In one aspect, the gasification zone is a cross flow unit and the burn-up zone is a counter current unit. In one aspect, the gasification zone is a cross flow unit and the burn-up zone is a counter current moving bed unit. In one aspect, the gasification zone is a cross flow moving bed unit and the burn-up zone is a counter current unit with gas flowing upward and solid moving downward.

In one aspect, the gasification zone may include one or more sections or gasification hearths for contacting said carbonaceous material with a first molecular oxygen-containing gas and optionally with one or more of steam and $CO_2$ to gasify a portion of said carbonaceous material and to produce a first gaseous product. In various aspects, the gasification zone includes 1, 2, 3, 4, 5, 6, 7, 8, 9, or 10 sections or gasification hearths. In one aspect, the burn-up zone includes one or more burn-up hearths for contacting remaining portion of said carbonaceous material with a second molecular oxygen-containing gas to gasify an additional portion of said carbonaceous material and to produce a second gaseous product and solid ash. In various aspects, the burn-up zone may include 1, 2, 3, 4, or 5 sections or burn-up hearths. In one aspect, the gasification-apparatus includes one gasification hearth and one burn-up hearth. In one aspect, the gasification-apparatus includes two gasification hearths and one burn-up hearth. In one aspect, the gasification-apparatus includes three gasification hearths and one burn-up hearth. In one aspect, the gasification-apparatus includes four gasification hearths and one burn-up hearth. In one aspect, the gasification-apparatus includes five gasification hearths and one burn-up hearth. In one aspect, the gasification-apparatus includes two gasification hearths and two burn-up hearths. In one aspect, the gasification-apparatus includes three gasification hearths and two burn-up hearth. In one aspect, the gasification-apparatus includes four gasification hearths and two burn-up hearth. In one aspect, the gasification-apparatus includes five gasification hearths and two burn-up hearth. In one aspect, one or more of said gasification hearths may be used to accomplish preheating of said carbonaceous material. Said preheating can be accomplished by heat exchange with one or more of said first gaseous product and said second gaseous product. In one aspect, one or more of said burn-up hearths provide arrangement for up-flow of gas and down-flow of solid.

Raw syngas produced in the process described above often includes tar that is undesirable for downstream operation and use. Reduction of tar content of raw syngas can be accomplished by contacting said raw syngas with a third molecular oxygen containing gas in a tar destruction zone. Partial oxidation and/or cracking of tar contained in said raw syngas is accomplished in the tar reduction zone. A hot syngas is thus produced with no or a substantially low tar content. Therefore, in one aspect, said gasification-apparatus includes a tar reduction zone for treating said raw syngas comprising said first gaseous product and said second gaseous product with a third molecular oxygen containing gas. The tar reduction zone can be a horizontal or a vertical chamber with circular or square or rectangular or any other cross section. The tar reduction zone can be inclined to the horizontal or vertical direction. The tar reduction zone can be connected to the gasification zone or to the burn-up zone or to both the gasification zone and the burn-up zone through one or more connecting zones or throats. In one aspect, the tar reduction zone is connected to the gasification zone through one connecting zone. A gas inlet can be attached directly to the tar reduction zone. One or more gas inlets can be attached to one or more connecting zones (throats). The third molecular oxygen containing gas can be introduced directly into the tar reduction zone. The third molecular oxygen containing gas can be introduced into the tar reduction zone through one or more gas inlets attached to one or more connecting zones.

Gas inlets for introduction of the first molecular oxygen containing gas can be attached to the gasification zone or one or more hearths contained therein. Gas inlets for introduction of the second molecular oxygen containing gas can be attached to the burn-up zone or one or more hearths contained therein. Steam or $CO_2$ may also be introduced through one or more of these gas inlets. In one aspect, one or more of first molecular oxygen containing gas, steam and $CO_2$ may be introduced through the gas inlets attached to the gasification zone or to one or more hearths contained therein. In one aspect, one or more of first molecular oxygen containing gas, steam and $CO_2$ are pre-mixed prior to supplying to the gas inlets attached to the gasification zone or to one or more hearths contained therein. In one aspect, one or more of second molecular oxygen containing gas, steam and $CO_2$ are pre-mixed prior to supplying to the gas inlets attached to the burn-up zone or to one or more hearths contained therein.

In one aspect the gasification zone includes an entry hearth and one or more additional gasification hearths, wherein the carbonaceous material feed is introduced into the entry hearth. In one aspect, the first molecular oxygen containing gas is not supplied through gas inlet attached to the entry hearth. In one aspect, no gas inlet is attached the entry hearth. The carbonaceous material introduced in the entry hearth optionally comes in contact with one or more of the first and the second gaseous product that contain heat. Heat contained in said one or more of the first and the second gaseous product may thus be exchanged with the carbonaceous material thereby accomplishing drying or pre-drying of carbonaceous material. A dried or pre-dried carbonaceous material is thus transferred to subsequent hearths. Thermal decomposition or gasification of a portion of carbonaceous material may also occur in the entry hearth.

One or more mechanical devices such as transfer rams may be used to facilitate movement of solid inside the gasification zone e.g. from one gasification hearth to the next and inside the burn-up zone, e.g. from one burn-up hearth to the next and to facilitate transfer of solid from the gasification zone to the burn up zone. In one aspect, the bottom of the gasification zone is positioned at a level above the bottom of the burn-up zone in order to facilitate movement of solid. In one aspect, the bottom of any gasification hearth is placed at a level lower than the bottom of the previous hearth as solid moves from the entry hearth to the burn-up zone. In one aspect, the bottom of any burn-up hearth is placed at a level lower than the bottom of the previous hearth as solid moves towards the exit hearth. In an aspect wherein the gasification zone includes an entry hearth and one or more additional gasification hearths, no transfer ram is used in the entry hearth; in this entry hearth, solid is pushed into the next gasification hearth by feeding more feed solid (carbonaceous material). In one aspect, one or more transfer rams (ash removal rams) are used in the burn-up zone to remove solid ash. Several methods can be employed to remove solid ash out of the burn-up zone. In one aspect, a water seal is used in which an ash removal ram pushes solid ash into a pool of water, using water as a seal in order to minimize, preferably avoid, air leakage into the burn-up zone. The wet ash is then moved out of the water using a conveyor belt. In another aspect, the ash is removed through a lock-hopper system to minimize, preferably avoid air leakage into the burn-up zone. For example double ash doors comprising an upper ash door and a lower ash door can be used to provide the seal. In one aspect, keeping the lower ash door closed to provide a seal, the upper ash door is opened to allow ash to fall downward into a non-combustion zone in which the ash can cool down. In order to remove ash, the upper ash door is closed first to provide the seal and then the lower ash door is opened and an ash removal ram pushes cooled ash out of gasifier. This method removes dry ash and can have advantage if ash has any direct usage as no drying is required prior to such direct usage of ash.

A high enough temperature is attained in the gasification-apparatus to facilitate gasification of carbonaceous material. However, the temperature is maintained low enough so that non-carbonaceous mineral matter contained in carbonaceous material feed may not melt inside the gasification-apparatus. In other words, temperature in any part of the gasification zone or of the burn-up zone may not exceed the melting point temperature of ash comprising said non-carbonaceous mineral matter. Typically, a gas phase temperature not exceeding 800° C. is maintained in the gasification zone as well as in the burn-up zone. In one aspect, temperatures in the gasification zone and in the burn-up zone are maintained in the range 260-800° C. Thus solid ash comprising said non-carbonaceous mineral matter accumulates in the burn-up zone and a stream of solid ash is removed from the burn-up zone.

The tar reduction zone provides a short contact time but is operated at a high enough temperature in order to ensure adequate destruction of tar. The temperature in the tar reduction zone can be between 900 and 2000° C. Reaction time or contact time in the tar reduction zone can be in a range of about 0.5 to about 5 seconds.

Raw syngas is produced that may include carbon monoxide (CO) and carbon dioxide ($CO_2$). It is desirable to have more CO and less $CO_2$ in the raw syngas. In one aspect, the $CO/CO_2$ molar ratio in said raw syngas is greater than about 0.75. In one aspect, the $CO/CO_2$ molar ratio in said raw syngas is greater than about 1.0. In one aspect, $CO/CO_2$ molar ratio in said raw syngas is greater than about 1.5. Hot syngas may include carbon monoxide (CO) and carbon dioxide ($CO_2$). It is desirable to have more CO and less $CO_2$ in the hot syngas. In one aspect, the $CO/CO_2$ molar ratio in said hot syngas is greater than about 0.75. In one aspect, the $CO/CO_2$ molar ratio in said hot syngas is greater than about 1.0. In one aspect, $CO/CO_2$ molar ratio in said hot syngas is greater than about 1.5.

In addition to containing non-carbonaceous mineral matter, solid ash may include unconverted carbon or unconverted carbonaceous matter. In one aspect, carbon content of said solid ash is less than about 10 wt %. In one aspect, carbon content of solid ash is less than 5 wt %. In one aspect, ratio of carbon content of solid ash to carbon content of carbonaceous material feed is less than about 0.1. In one aspect, ratio of carbon content of solid ash to carbon content of carbonaceous material feed is less than about 0.01.

The carbon content of ash and carbon content of carbonaceous material feed refers to carbon or a chemical that contains carbon. In this aspect, numerous known techniques may be utilized to measure carbon content. Some examples of techniques that may be used to measure carbon include and are not limited to loss-on-ignition (LOI) tests, themogravimetric analysis (TGA), laser probe based optical methods, methods using microwave radiation, methods using nuclear magnetic resonance (NMR), and various ASTM methods (see for example ASTM D6316).

Undesirable hot spots might be created in said gasification-apparatus in one or more of the gasification zone and the burn-up zone, or hearths contained therein, due to uneven distribution of molecular oxygen containing gas in said carbonaceous material feed. This may cause poor quality in raw syngas produced. Hot spots can also cause localized melting of ash. Formation of hot spots can be reduced or prevented by injecting one or more of steam and carbon dioxide into one or more of said gasification zone and said burn-up zone. Thus, in order to prevent undesirable hot spots, carbonaceous material feed may be treated with steam along with molecular oxygen in the gasification zone. Carbonaceous material feed may be treated with $CO_2$ gas along with molecular oxygen in the gasification zone. Carbonaceous material feed may be treated with steam along with molecular oxygen in the burn-up zone. Carbonaceous material feed may be treated with $CO_2$ gas along with molecular oxygen in the burn-up zone. Thus the first molecular oxygen-containing gas may include one or more of steam and carbon dioxide gas and the second molecular oxygen-containing gas may include one or more of steam and carbon dioxide gas.

As described above, a sub-stoichiometric amount of oxygen is supplied to the gasification apparatus in order to promote production of carbon monoxide. Therefore, in one aspect, the ratio of the total amount of molecular oxygen contained in the first molecular oxygen containing gas and the second molecular oxygen containing gas to the total amount of molecular oxygen required to completely oxidize all carbon contained in carbonaceous material feed to carbon dioxide is in a range of 0.1 to 0.9. In one aspect, the ratio of the total amount of molecular oxygen contained in the first molecular oxygen containing gas and the second molecular oxygen containing gas to the total amount of molecular oxygen required to completely oxidize all carbon contained in carbonaceous material feed to carbon dioxide is in a range of 0.1 to 0.9. In one aspect, ratio of total amount of molecular oxygen contained in the first molecular oxygen containing gas, the second molecular oxygen containing gas and the third molecular oxygen containing gas to the total amount of molecular oxygen required to completely oxidize all carbon contained in carbonaceous material feed to carbon dioxide is in a range of 0.1 to 0.9. In one aspect, ratio of total amount of molecular oxygen contained in the first molecular oxygen containing gas, the second molecular oxygen containing gas and the third molecular oxygen containing gas to the total amount of molecular oxygen required to completely oxidize all carbon contained in carbonaceous material feed to carbon dioxide is in a range of 0.1 to 0.9.

Careful control of temperatures in the gasification zone and in the burn-up zone and rates of supplies of oxygen into the gasification zone and into the burn-up zone are required in order to achieve low content of carbon in solid ash and high $CO/CO_2$ ratio in raw syngas. A higher amount to oxygen per unit amount of available carbon in carbonaceous material is provided in the burn-up zone compared to the amount to oxygen per unit amount of available carbon in carbonaceous material provided in the gasification zone. Thus the mass of total oxygen per unit mass of total carbon in carbonaceous material feed entering gasification zone is less than mass of total oxygen per unit mass of total carbon in unconverted portion of carbonaceous material feed entering burn-up zone. Mass of total oxygen per unit mass of total carbon in carbonaceous material feed entering gasification zone can be in a range comprising 0.1 to 2.0 lb/lb. Mass of total oxygen per unit mass of total carbon in unconverted portion of carbonaceous material feed entering burn-up zone can be in a range comprising 0.25 to 2.5 lb/lb. Any chemically bonded oxygen contained in the carbonaceous material as well as chemically bonded oxygen contained in any steam or $CO_2$ that is supplied may participate in the chemical transformation and gasification of carbonaceous material. It is, therefore, important to consider any chemically bonded oxygen contained in the carbonaceous material as well as chemically bonded oxygen contained in any steam or $CO_2$ that is supplied in determining amount of molecular oxygen to be supplied.

In order to supply molecular oxygen said first molecular oxygen containing gas may include air. In order to supply molecular oxygen said first molecular oxygen containing gas may include enriched air. In order to supply molecular oxygen said first molecular oxygen containing gas may include pure oxygen. In order to supply molecular oxygen said second molecular oxygen containing gas may include air. In order to supply molecular oxygen said second molecular oxygen containing gas may include enriched air. In order to supply molecular oxygen said second molecular oxygen containing gas may include pure oxygen.

In one aspect, molecular oxygen containing gas is distributed horizontally inside one or more gasification hearths. In one aspect, molecular oxygen containing gas is distributed vertically in one or more burn-up hearths. In one aspect, introduction of molecular oxygen containing gas in one or more burn-up hearths is discontinuous. In one aspect, one or more of gas inlets are equipped with cooling device. In one aspect, one or more of said cooling devices are water jackets on the gas inlets. In one aspect, one or more gas inlets extend out of transfer rams. In one aspect, additional nozzles on the surface of transfer rams are used for introduction of molecular oxygen containing gas.

The third molecular oxygen containing gas may include air. The third molecular oxygen containing gas may include enriched air. The third molecular oxygen containing gas may include pure oxygen.

In one aspect, the same molecular oxygen containing gas is supplied to one or more of gasification zone, burn-up zone and tar reduction zone. In one aspect, different molecular oxygen containing gases are supplied to the gasification zone, the burn-up zone and the tar reduction zone.

Total amount of molecular oxygen introduced in the gasification zone and the burn-up zone through said molecular oxygen containing gas can be in a range of about 0 to about 75 lb-moles per ton of carbonaceous material on a dry basis. In various aspects, amounts of molecular oxygen supplied to the gasification zone and to the burn-up zone may include a range selected from: 0 to 5, 0 to 50, 0 to 75, 5 to 10, 10 to 15, 15 to 20, 20 to 25, 25 to 30, 30 to 35, 35 to 40, 40 to 45, 45 to 50, 50 to 55, 55 to 60, 60 to 65, and 65 to 70 lb-moles per ton of carbonaceous material feed on a dry basis. In various aspects, amounts of molecular oxygen supplied to one or more of the gasification hearths and burn-up hearths may include a range selected from: 0 to 5, 0 to 50, 0 to 75, 5 to 10, 10 to 15, 15 to 20, 20 to 25, 25 to 30, 30 to 35, 35 to 40, 40 to 45, 45 to 50, 50 to 55, 55 to 60, 60 to 65, and 65 to 70 lb-moles per ton of carbonaceous material feed on a dry basis.

Total amount of steam introduced in the gasification zone and the burn-up zone can be in a range of about 0 to about 50 lb-moles per ton of carbonaceous material feed on a dry basis. In various aspects, amount of steam added in one or more of the gasification zone and the burn-up zone may include a range selected from: 0 to 5, 5 to 10, 10 to 15, 15 to 20, 20 to 25, 25 to 30, 30 to 35, 35 to 40, 40 to 45, and 45 to 50 lb-moles per ton of carbonaceous material feed on a dry basis. In various aspects, amount of steam added in one or more of the gasification hearths and the burn-up hearths may include a range selected from: 0 to 5, 5 to 10, 10 to 15, 15 to 20, 20 to 25, 25 to 30, 30 to 35, 35 to 40, 40 to 45, and 45 to 50 lb-moles per ton of carbonaceous material feed on a dry basis.

Total amount of carbon dioxide gas introduced in the gasification zone and the burn-up zone can be in the range of about 0 to about 50 lb-moles per ton of carbonaceous material feed on a dry basis. In various aspects, amount of carbon dioxide gas added in one or more of the gasification zone and the burn-up zone may include a range selected from: 0 to 5, 5 to 10, 10 to 15, 15 to 20, 20 to 25, 25 to 30, 30 to 35, 35 to 40, 40 to 45, and 45 to 50 lb-moles per ton of carbonaceous material feed on a dry basis. In various aspects, amount of carbon dioxide gas added in one or more of the gasification hearths and the burn-up hearths may include a range selected from: 0 to 5, 5 to 10, 10 to 15, 15 to 20, 20 to 25, 25 to 30, 30 to 35, 35 to 40, 40 to 45, and 45 to 50 lb-moles per ton of carbonaceous material feed on a dry basis.

In one aspect, both steam and carbon dioxide gas are introduced in one or more of the gasification and burn-up zones. In one aspect, one or more of steam and carbon dioxide gas are injected in one or more lines supplying oxygen to blend in with oxygen lines just before distribution nozzle.

The total amount of oxygen added in the tar reduction zone can be in a range of about 0 to about 75 lb-moles per ton of carbonaceous material feed on a dry basis. In various aspects, amounts of molecular oxygen supplied to the tar reduction zone may include a range selected from: 0 to 5, 0 to 50, 0 to 75, 5 to 10, 10 to 15, 15 to 20, 20 to 25, 25 to 30, 30 to 35, 35 to 40, 40 to 45, 45 to 50, 50 to 55, 55 to 60, 60 to 65, and 65 to 70 lb-moles per ton of carbonaceous material feed on a dry basis.

In one aspect of said gasification-apparatus, pressure is maintained at a negative (sub-atmospheric) pressure in order to avoid leakage of flammable and toxic syngas into the surroundings. However, this action leads to leakage of air into the gasifier, e.g. around moving rams and doors. Such leakage of air may cause loss of raw syngas. It may also cause a dilution of raw syngas. Thus a careful control of the gasifier draft is necessary to reduce air leakage. Gasifier draft can be controlled at a negative (sub-atmospheric) pressure in a range of 0.01 to 0.50 inch water. One way of accomplishing this is by manually setting a fan speed (to control hot syngas temperature) and adjusting solids and oxygen feed rates to control draft. Draft control can also be achieved with flow control of one or more of carbon dioxide and steam under the carbonaceous material bed. In one aspect, for example during start-up, pressure may be atmospheric or greater than atmospheric.

Air admitted with the carbonaceous material feed can be reduced by using a screw feeder which compresses the carbonaceous material feed. Air admitted with the carbonaceous material feed can also be reduced by using purged lock hoppers. In one aspect, for example during start-up, air leakage may be allowed.

In one aspect, a methane containing gas such as natural gas is introduced in one or more of the gasification zone, the burn-up zone and the tar reduction zone especially in order to facilitate start-up.

The carbonaceous material fed to the gasifier may include selection from: carbonaceous material, carbonaceous liquid product, carbonaceous industrial liquid recycle, carbonaceous municipal solid waste (MSW or msw), carbonaceous urban waste, carbonaceous agricultural material, carbonaceous forestry material, carbonaceous wood waste, carbonaceous construction material, carbonaceous vegetative material, carbonaceous industrial waste, carbonaceous fermentation waste, carbonaceous petrochemical co-products, carbonaceous alcohol production co-products, carbonaceous coal, tires, plastics, waste plastic, coke oven tar, fibersoft, lignin, black liquor, polymers, waste polymers, polyethylene terephthalate (PETA), polystyrene (PS), sewage sludge, animal waste, crop residues, energy crops, forest processing residues, wood processing residues, livestock wastes, poultry wastes, food processing residues, fermentative process wastes, ethanol co-products, spent gain, spent microorganisms, or their combinations.

In one aspect of the present disclosure the carbonaceous material fed to the gasifier includes a plurality of carbonaceous materials selected from carbonaceous material, carbonaceous liquid product, carbonaceous industrial liquid recycle, carbonaceous municipal solid waste (MSW or msw), carbonaceous urban waste, carbonaceous agricultural material, carbonaceous forestry material, carbonaceous wood waste, carbonaceous construction material, carbonaceous vegetative material, carbonaceous industrial waste, carbonaceous fermentation waste, carbonaceous petrochemical co-products, carbonaceous alcohol production co-products, carbonaceous coal, tires, plastics, waste plastic, coke oven tar, fibersoft, lignin, black liquor, polymers, waste polymers, polyethylene terephthalate (PETA), polystyrene (PS), sewage sludge, animal waste, crop residues, energy crops, forest processing residues, wood processing residues, livestock wastes, poultry wastes, food processing residues, fermentative process wastes, ethanol co-products, spent grain, spent microorganisms, or their combinations.

In one aspect, said carbonaceous material includes water. In one aspect, said carbonaceous material includes less than about 50 wt % water. In one aspect, said carbonaceous material includes less than about 25 wt % water. In one aspect said carbonaceous material includes less than about 15 wt % water. In one aspect, moisture content of said carbonaceous material is decreased by pre-drying.

In one aspect, said carbonaceous material includes greater than about 25 wt % carbon on a dry or water free basis. In one aspect said carbonaceous material includes greater than about 50 wt % carbon on a dry or water free basis. In one aspect, said carbonaceous material includes oxygen in the range of about 0 to about 50 wt % oxygen on a dry or water free basis. In one aspect said carbonaceous material includes hydrogen in the range of about 0 to about 25 wt % hydrogen on a dry or water free basis. In one aspect, said carbonaceous material includes less than about 25 wt % ash on a dry or water free basis. In one aspect said carbonaceous material includes less than about 15 wt % ash on a dry or water free basis.

In various aspects, the temperature in one or more of the gasification zone and burn-up zone can be selected from temperature ranges: 260-270° C., 270-280° C., 280-290° C., 290-300° C., 300-310° C., 310-320° C., 320-330° C., 330-340° C., 340-350° C., 350-360° C., 360-370° C., 370-380° C., 380-390° C., 390-400° C., 400-410° C., 410-420° C., 420-430° C., 430-440° C., 440-450° C., 450-460° C., 460-470° C., 470-480° C., 480-490° C., 490-500° C., 500-510° C., 520-530° C., 530-540° C., 540-550° C., 550-560° C., 560-570° C., 570-580° C., 580-590° C., 590-600° C., 600-610° C., 610-620° C., 620-630° C., 630-640° C., 640-650° C., 650-660° C., 660-670° C., 670-680° C., 680-690° C., 690-700° C., 700-710° C., 710-720° C., 720-730° C., 730-740° C., 740-750° C., 750-760° C., 760-770° C., 770-780° C., 780-790° C., and 790-800° C.

In various aspects, the temperature in one or more of the gasification hearths and the burn-up hearths can be selected from temperature ranges: 260-270° C., 270-280° C., 280-290° C., 290-300° C., 300-310° C., 310-320° C., 320-330° C., 330-340° C., 340-350° C., 350-360° C., 360-370° C., 370-380° C., 380-390° C., 390-400° C., 400-410° C., 410-420° C., 420-430° C., 430-440° C., 440-450° C., 450-460° C., 460-470° C., 470-480° C., 480-490° C., 490-500° C., 500-510° C., 520-530° C., 530-540° C., 540-550° C., 550-560° C., 560-570° C., 570-580° C., 580-590° C., 590-600° C., 600-610° C., 610-620° C., 620-630° C., 630-640° C., 640-650° C., 650-660° C., 660-670° C., 670-680° C., 680-690° C., 690-700° C., 700-710° C., 710-720° C., 720-730° C., 730-740° C., 740-750° C., 750-760° C., 760-770° C., 770-780° C., 780-790° C., and 790-800° C.

In one aspect, temperatures in the gasification zone and the burn-up zone are same. In one aspect, temperatures in the gasification zone and the burn-up zone are different. In one aspect, the temperature in the burn-up zone is greater than the temperature in the gasification zone. In one aspect, the temperatures in all hearths in the gasification zone and the burn-up zone are same. In one aspect, different hearths are maintained at different temperatures. In one aspect, the temperature in one or more burn-up hearth(s) can be greater than the temperature in one or more gasification hearth(s). In one aspect the temperature increases from the entry hearth of the gasification zone to the exit hearth of the burn-up zone.

In various aspects, the temperature in the tar reduction zone can be selected from temperature ranges: 900-910° C., 910-920° C., 920-930° C., 930-940° C., 940-950° C., 950-960° C., 960-970° C., 970-980° C., 980-990° C., 990-1000° C., 1000-1010° C., 1010-1020° C., 1020-1030° C., 1030-1040° C., 1040-1050° C., 1050-1060° C., 1060-1070° C., 1070-1080° C., 1080-1090° C., 1090-1100° C., 1100-1110° C., 1110-1120° C., 1120-1130° C., 1130-1140° C., 1140-1150° C., 1150-1160° C., 1160-1170° C., 1170-1180° C., 1180-1190° C., 1190-1200° C., 1200-1210° C., 1210-1220° C., 1220-1230° C., 1230-1240° C., 1240-1250° C., 1250-1260° C., 1260-1270° C., 1270-1280° C., 1280-1290° C., 1290-1300° C., 1300-1310° C., 1310-1320° C., 1320-1330° C., 1330-1340° C., 1340-1350° C., 1350-1360° C., 1360-1370° C., 1370-1380° C., 1380-1390° C., 1390-1400° C., 1400-1410° C., 1410-1420° C., 1420-1430° C., 1430-1440° C., 1440-1450° C., 1450-1460° C., 1460-1470° C., 1470-1480° C., 1480-1490° C., 1490-1500° C., 1500-1510° C., 1510-1520° C., 1520-1530° C., 1530-1540° C., 1540-1550° C., 1550-1560° C., 1560-1570° C., 1570-1580° C., 1580-1590° C., 1590-1600° C., 1600-1610° C., 1610-1620° C., 1620-1630° C., 1630-1640° C., 1640-1650° C., 1650-1660° C., 1660-1670° C., 1670-1680° C., 1680-1690° C., 1690-1700° C., 1700-1710° C., 1710-1720° C., 1720-1730° C., 1730-1740° C., 1740-1750° C., 1750-1760° C., 1760-1770° C., 1770-1780° C., 1780-1790° C., 1790-1800° C., 1800-1810° C., 1810-1820° C., 1820-1830° C., 1830-1840° C., 1840-1850° C., 1850-1860° C., 1860-1870° C., 1870-1880° C., 1880-1890° C., 1890-1900° C., 1900-1910° C., 1910-1920° C., 1920-1930° C., 1930-1940° C., 1940-1950° C., 1950-1960° C., 1960-1970° C., 1970-1980° C., 1980-1990° C., 1990-2000° C.

Figure 1:
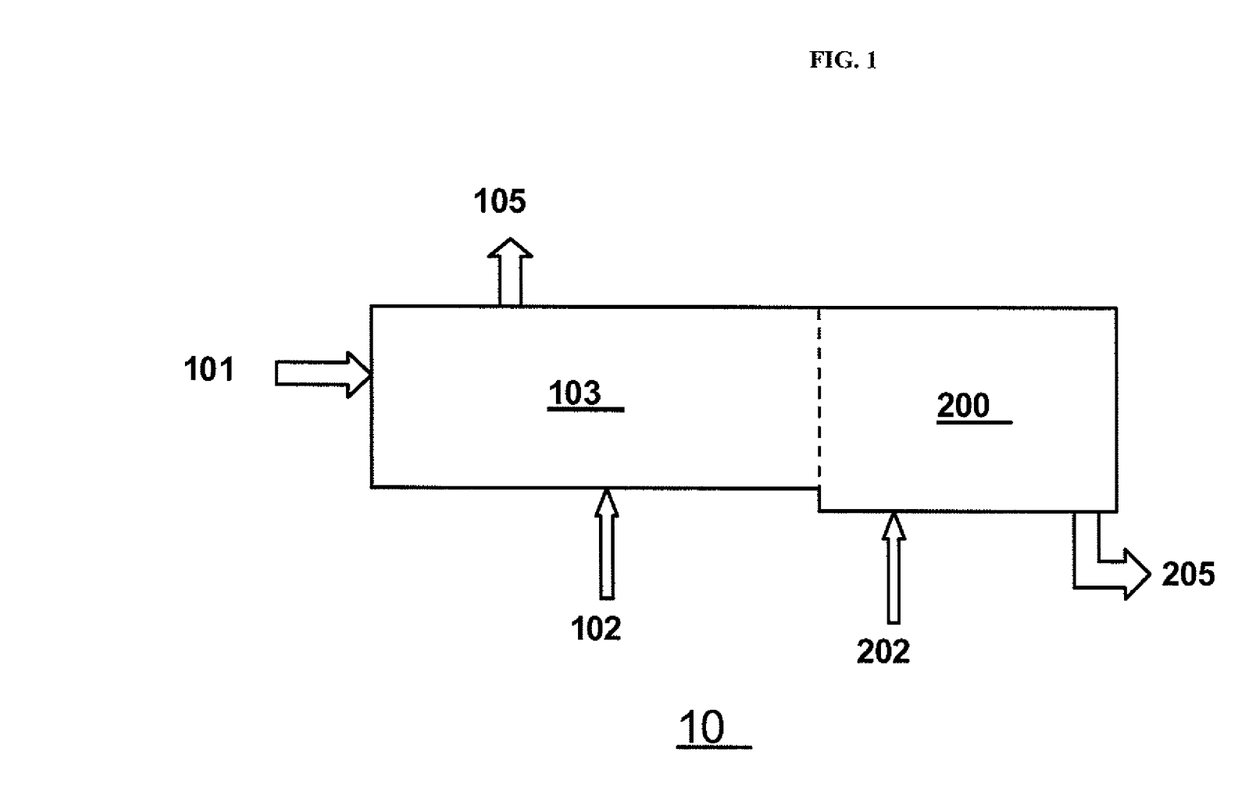
FIG. 1 is a schematic diagram of a gasification-apparatus that includes a gasification zone and a burn-up zone.

Specific aspects of the present disclosure are described with reference to FIGS. 1 to 4. Thus FIG. 1 provides a schematic diagram of an aspect of the present disclosure wherein the gasification-apparatus (10) includes a gasification zone (103) comprising one gasification hearth and a burn-up zone (200) comprising one burn-up hearth. Carbonaceous material feed (101) is introduced in gasification zone. A first molecular oxygen containing gas (102) is supplied to the gasification zone. A first gaseous product is produced in the gasification zone. Unconverted portion of carbonaceous material is transferred from the gasification zone to the burn-up zone. A second molecular oxygen containing gas (202) is supplied to the burn-up zone. A second gaseous product is produced in the burn-up zone. Solid ash (205) is removed from the burn-up zone. The first and the second gaseous products are combined to produce a raw syngas stream (105) that is removed from gasification zone.

Figure 2:
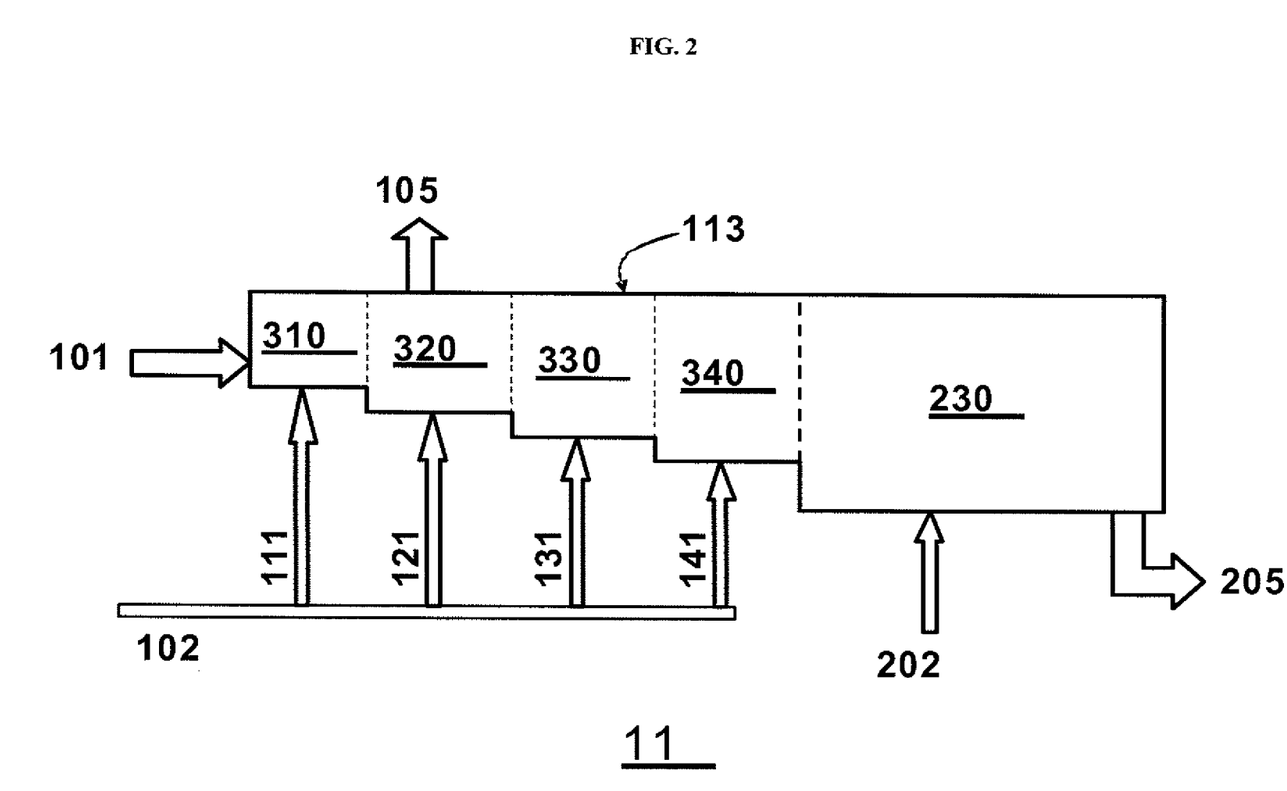
FIG. 2 is a schematic diagram of an aspect of a gasification-apparatus that includes a gasification zone and a burn-up zone wherein the gasification zone includes four sections or hearths.

FIG. 2 presents a schematic diagram of gasification-apparatus (10) wherein gasification zone includes four gasification hearths: Hearth-I, i.e. entry hearth (310), Hearth-II (320), Hearth-III (330), and Hearth-IV (340). Carbonaceous material feed (101) is introduced in the gasification zone in Hearth-I (entry hearth). Inside the gasification zone, solid from Hearth-I, i.e. entry hearth, is transferred to Hearth-II; solid from Hearth-II is transferred to Hearth-III; and solid from Hearth-III is transferred to Hearth-IV. Solid comprising unconverted portion of carbonaceous material is transferred from Hearth-IV of gasification zone into the burn-up zone (230). A first molecular oxygen containing gas is supplied to different gasification hearths through gas inlets 111, 121, 131, and 141 that are attached to Hearth-I, Hearth-II, Hearth-III, and Hearth-IV respectively. In one aspect, no molecular oxygen containing gas is introduced into Hearth-I (entry hearth). A second molecular oxygen containing gas is supplied to the burn-up zone through gas inlet 202. Solid ash (205) is removed from the burn-up zone.

One or more mechanical devices (not shown in diagram) such as transfer rams may be used to facilitate movement of solid from one hearth to the next or from one zone to the next, e.g. in FIG. 2, from Hearth-I to Hearth-II, from Hearth-II to Hearth-III, from Hearth-III to Hearth-IV, from Hearth-IV of the gasification zone to the burn-up zone. In one aspect, no transfer ram is used in Hearth-I, the entry hearth, wherein solid is pushed into next hearth by feeding more feed solid (carbonaceous material).

Figure 3:
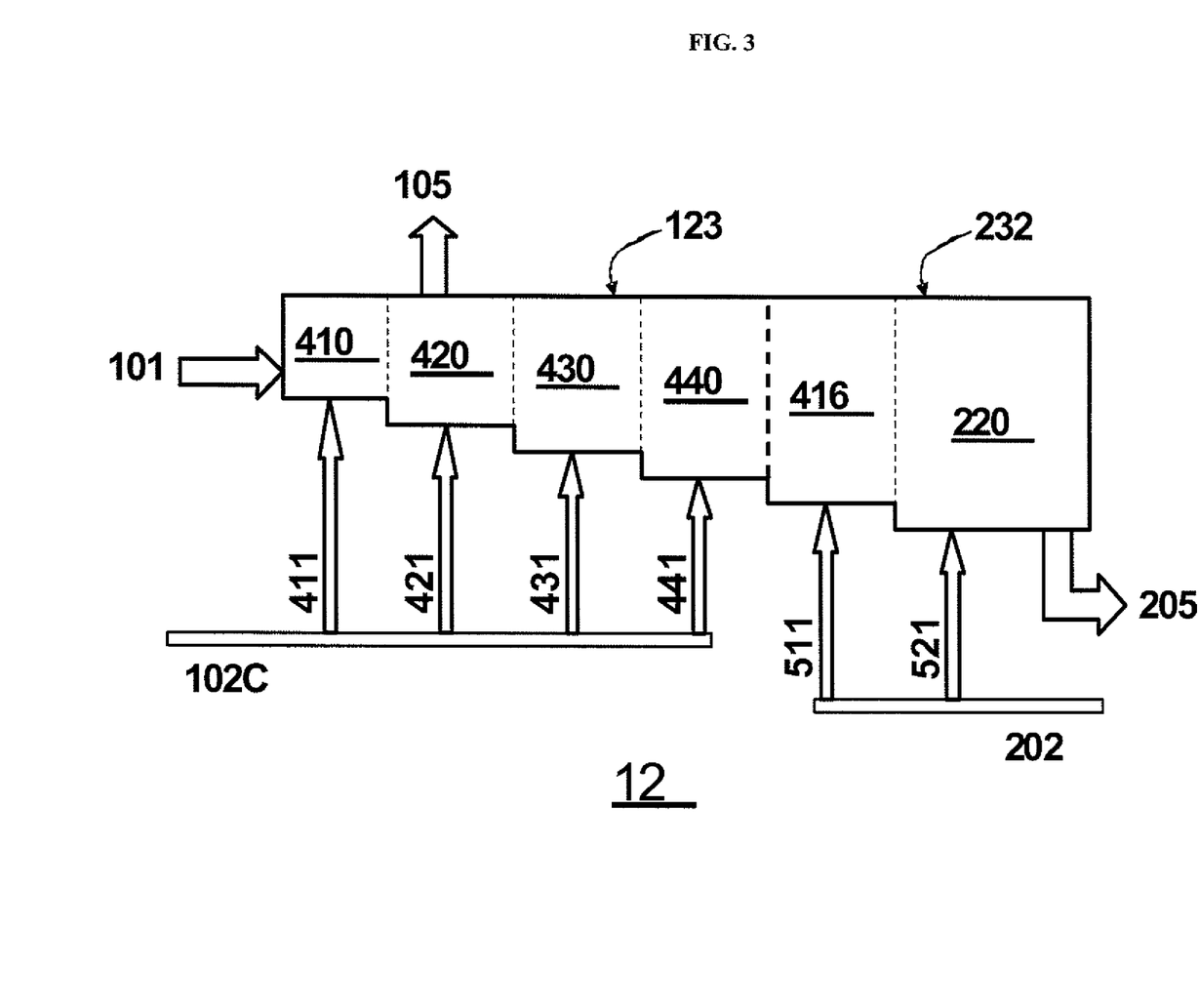
FIG. 3 is a schematic diagram of an aspect of a gasification-apparatus that includes a gasification zone and a burn-up zone wherein the gasification zone includes four sections or hearths and the burn-up zone includes two sections or hearths.

FIG. 3 presents a schematic diagram of an aspect of gasification-apparatus (10) wherein the gasification zone (123) includes four hearths: Hearth-I, i.e. entry hearth (410), Hearth-II (420), Hearth-III (430), and Hearth-IV (440). The burn-up zone (232) includes two hearths: Hearth-V (416), and exit hearth, Hearth-VI (220). Carbonaceous material feed (101) is introduced in the gasification zone in Hearth-I (entry hearth). Inside the gasification zone, solid from Hearth-I, i.e. entry hearth, is transferred to Hearth-II; solid from Hearth-II is transferred to Hearth-III; and solid from Hearth-III is transferred to Hearth-IV. Solid comprising unconverted portion of carbonaceous material is transferred from Hearth-IV of gasification zone into Hearth-V of the burn-up zone. Inside the burn-up zone, solid from Hearth-V is transferred to Hearth-VI (exit hearth). A first molecular oxygen containing gas is supplied to different gasification hearths through gas inlets 411, 421, 431, and 441 that are attached to Hearth-I, Hearth-II, Hearth-III, and Hearth-IV respectively. In one aspect, no molecular oxygen containing gas is introduced into Hearth-I (entry hearth). A second molecular oxygen containing gas is supplied to different gasification hearths through gas inlets 511, and 521 that are attached to Hearth-V, and Hearth-VI (exit hearth) respectively. Solid ash (205) is removed from Hearth VI (exit hearth) of the burn-up zone.

One or more mechanical devices (not shown in diagram) such as transfer rams may be used to facilitate movement of solid from one hearth to the next or from one zone to the next, e.g. in FIG. 3, from Hearth-I to Hearth-II, from Hearth-II to Hearth-III, from Hearth-III to Hearth-IV, from Hearth-IV of the gasification zone to Hearth-V of the burn-up zone, and from Hearth-V to Hearth-VI. In one aspect, no transfer ram is used in Hearth-I, the entry earth, wherein solid is pushed into next hearth by feeding more feed solid (carbonaceous material).

Figure 4:
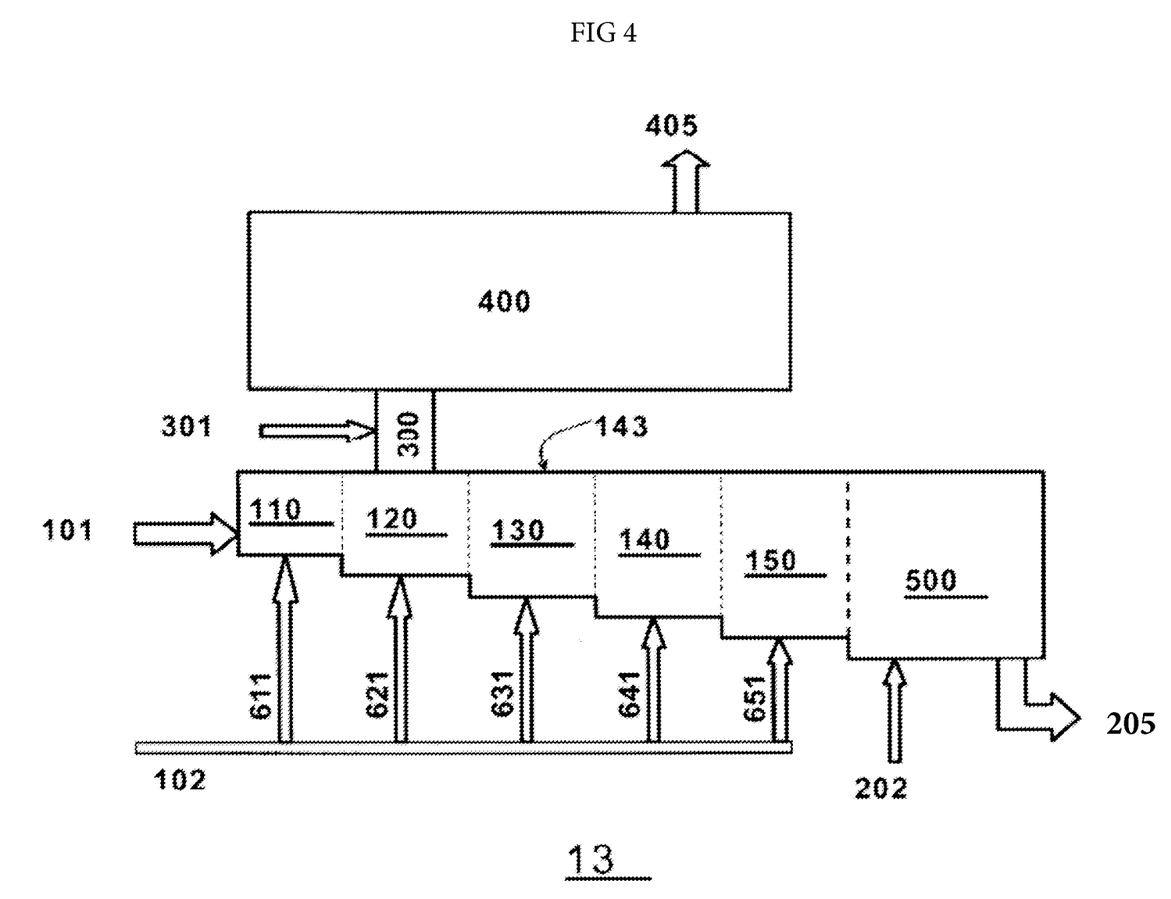
FIG. 4 is a schematic diagram of an aspect of a gasification-apparatus that includes a gasification zone, a burn-up zone and a tar reduction zone wherein the gasification zone includes five sections or hearths.

FIG. 4 presents a schematic diagram of one aspect of gasification-apparatus (13) comprising a gasification zone (143), burn-up zone (500), and a tar reduction zone (400) wherein the gasification zone (143) includes five hearths: Hearth-I, i.e. entry hearth (110), Hearth-II (120), Hearth-III (130), Hearth IV (140), and Hearth-V (150). Carbonaceous material feed (101) is introduced in the gasification zone in Hearth-I. Inside the gasification zone, solid from Hearth-I, i.e. entry hearth, is transferred to Hearth-II; solid from Hearth-II is transferred to Hearth-III; solid from Hearth-III is transferred to Hearth-IV, and solid from Hearth-IV is transferred to Hearth-V. Solid comprising unconverted portion of carbonaceous material is transferred from Hearth-V of gasification zone into the burn-up zone (500). A first molecular oxygen containing gas is supplied to different gasification hearths though gas inlets 611, 621, 631, 641, and 651 that are attached to Hearth-I, Hearth-II, Hearth-III, Hearth-IV, and Hearth-V respectively. In one aspect, no molecular oxygen containing gas is introduced into Hearth-I. A second molecular oxygen containing gas is supplied to the burn-up zone through gas inlet 202.

Gaseous product from burn-up zone is transferred to gasification zone and combined with gaseous product from gasification zone to produce a raw syngas stream (not shown on diagram) that is passed through a connecting zone or throat (300) into the tar reduction zone (400). A third molecular oxygen containing gas is introduced into the throat though gas inlet 301 wherein the raw syngas stream and third oxygen containing gas are mixed. In one aspect, the third molecular oxygen containing gas is introduced directly into the tar reduction zone (not shown on diagram). In one aspect, the third molecular oxygen containing gas is introduced into the throat as well as into the tar reduction zone (not shown on diagram). The mixture of raw syngas and oxygen containing gas is subjected to treatment with heat in the tar reduction zone. A hot syngas is thus produced and a stream of hot syngas (405) is removed from the tar reduction zone.

EXAMPLES

Example 1

A gasification apparatus comprising a gasification zone, a burn-up zone and tar destruction zone was used in this example. Carbonaceous material feed was introduced into the gasification zone. A first molecular oxygen containing gas was supplied to the gasification zone at the rate of about 10 to about 15 lb-moles per ton of water-free carbonaceous material to gasify a portion of the carbonaceous material and produce a first gaseous product.

Remaining carbonaceous material from the gasification zone was forwarded to the burn-up zone wherein a second molecular oxygen containing gas was supplied at the rate of about 10 to about 15 lb-moles per ton of water-free carbonaceous material to gasify additional portion of carbonaceous material and produce a second gaseous product.

The first and second gaseous products were combined to produce a raw syngas that was allowed to enter a tar destruction zone. A third molecular oxygen containing gas was supplied to the tar destruction zone at the rate of about 20 to about 30 lb-moles per ton of water-free carbonaceous material. A hot syngas was produced and removed from the tar destruction zone.

The gasification zone was also fed a stream of carbon dioxide at the rate of about 10 to about 15 lb-moles per ton of water-free carbonaceous material. The burn-up zone was fed a stream of carbon dioxide at the rate of about 2 to about 5 lb-moles per ton of water-free carbonaceous material.

Additionally, about 20 to about 30 lb-moles of air per ton of water-free carbonaceous material entered the gasification process due to leakage.

For a ratio of oxygen input to burn-up zone to total oxygen input in gasification and burn-up zone in the range of about 0.4 to about 0.6, conversion of organic or gasifiable or volatile material content of carbonaceous material was above 90% and generally in the range of about 95 to about 98%. Ratio of the carbon content of residual ash produced to the carbon content of carbonaceous material feed was less than about 0.1 and generally in the range of about 0.04 to about 0.10. The ratio of $CO/CO_2$ in the hot syngas produced was greater than about 0.75; the ratio of $CO/H_2$ in the hot syngas produced was greater than 1.5; the ratio of $CO/(CO+CO_2)$ was greater than about 0.4.

For a ratio of oxygen input to burn-up zone to total oxygen input in gasification and burn-up zone less than about 0.4, conversion of organic or gasifiable or volatile material content of carbonaceous material was about 82%. Ratio of the carbon content of residual ash produced to the carbon content of carbonaceous material feed was about 0.3.

While the invention herein disclosed has been described by means of specific embodiments, examples and applications thereof, numerous modifications and variations could be made thereto by those skilled in the art without departing from the scope of the invention set forth in the claims.

What is claimed is:

1. A process for gasification of a carbonaceous material to produce a raw syngas, said process comprising:
    (a) contacting a moving bed of said carbonaceous material with a first molecular oxygen-containing gas and optionally with one or more of steam and $CO_2$ in a gasification zone to gasify a portion of said carbonaceous material and to produce a first gaseous product;
    (b) contacting an unconverted portion of said carbonaceous material from said gasification zone with a second molecular oxygen-containing gas and optionally with one or more of steam and $CO_2$ in a burn-up zone to gasify an additional portion of said carbonaceous material and to produce a second gaseous product and a solid ash comprising carbon; and
    (c) conveying said first gaseous product, said second gaseous product, and a third molecular oxygen-containing gas to a connecting zone to produce said raw syngas,
    wherein a $CO/CO_2$ molar ratio in said raw syngas is greater than about 0.75 and ratio of carbon content of solid ash to carbon content of carbonaceous material feed is less than about 0.1.

2. The process of claim 1 wherein the $CO/CO_2$ molar ratio in said raw syngas is greater than about 1.0.

3. The process of claim 1 wherein a weight ratio of carbon content of solid ash to carbon content of carbonaceous material feed is less than about 0.05.

4. The process of claim 1 wherein a weight ratio of carbon content of solid ash to carbon content of carbonaceous material feed is less than about 0.01.

5. The process of claim 1 wherein carbon content of said solid ash is less than about 10%.

6. The process of claim 1 wherein carbon content of said solid ash is less than about 5 weight %.

7. The process of claim 1 wherein mass of total oxygen per unit mass of total carbon in carbonaceous material feed entering gasification zone is less than mass of total oxygen per unit mass of total carbon in unconverted portion of carbonaceous material feed entering burn-up zone.

8. The process of claim 1 wherein the gasification zone includes one or more gasification hearths.

9. The process of claim 1 wherein the burn-up zone includes one or more burn-up hearths.

10. The process of claim 8 wherein one or more of said gasification hearths accomplish preheating of said carbonaceous material by heat exchange with one or more of said first gaseous product and second gaseous product.

11. The process of claim 1 wherein said carbonaceous material is selected from the group consisting of carbonaceous material, carbonaceous liquid product, carbonaceous industrial liquid recycle, carbonaceous municipal solid waste (MSW or msw), carbonaceous urban waste, carbonaceous agricultural material, carbonaceous forestry material, carbonaceous wood waste, carbonaceous construction material, carbonaceous vegetative material, carbonaceous industrial waste, carbonaceous fermentation waste, carbonaceous petrochemical co-products, carbonaceous alcohol production co-products, carbonaceous coal, tires, plastics, waste plastic, coke oven tar, fibersoft, lignin, black liquor, polymers, waste polymers, polyethylene terephthalate (PETA), polystyrene (PS), sewage sludge, animal waste, crop residues, energy crops, forest processing residues, wood processing residues, livestock wastes, poultry wastes, food processing residues, fermentative process wastes, ethanol co-products, spent grain, spent microorganisms, and mixtures thereof.

12. The process of claim 1 wherein ratio of total amount of molecular oxygen contained in the first molecular oxygen containing gas and the second molecular oxygen containing gas to the total amount of molecular oxygen required to completely oxidize all carbon contained in carbonaceous material feed to carbon dioxide is in a range of 0.1 to 0.9.

13. The process of claim 1 wherein molecular oxygen is introduced into the gasification zone and burn-up zone at a rate of about 0 to about 75 lb-mole per tone of carbonaceous material on a dry basis.

14. The process of claim 1 wherein a temperature of the gasification zone and burn-up zone is not greater than 800° C.

15. The process of claim 1 wherein the raw syngas has a tar equivalent content below about 10 ppm.

16. The process of claim 15 wherein the tar equivalent content is equivalent to a hydrocarbon selected from the group consisting of benzene, alcohol, and mixtures thereof.

17. A process for gasification of a carbonaceous material to produce a hot syngas, said process comprising:
    (a) contacting a moving bed of said carbonaceous material with a first molecular oxygen-containing gas and optionally with one or more of steam and $CO_2$ in a gasification zone to gasify a portion of said carbonaceous material and to produce a first gaseous product;
    (b) contacting an unconverted portion of said carbonaceous material from said gasification zone with a second molecular oxygen-containing gas and optionally with one or more of steam and $CO_2$ in a burn-up zone to gasify additional portion of said carbonaceous material and to produce a second gaseous product and a solid ash comprising carbon;
    (c) conveying said first gaseous product, said second gaseous product, and a third molecular oxygen containing gas to a connecting zone to produce a raw syngas comprising carbon monoxide (CO), carbon dioxide ($CO_2$) and tar; and
    (d) conveying said raw syngas from the connecting zone to a tar destruction zone to produce said hot syngas,
    wherein a $CO/CO_2$ molar ratio in said hot syngas is greater than about 0.75 and ratio of carbon content of solid ash to carbon content of carbonaceous material feed is less than about 0.1.

18. The process of claim 17 wherein the $CO/CO_2$ molar ratio in said raw syngas is greater than about 0.75.

19. The process of claim 17 wherein the $CO/CO_2$ molar ratio in said hot syngas is greater than about 1.0.

20. The process of claim 17 wherein a weight ratio of carbon content of solid ash to carbon content of carbonaceous material feed is less than about 0.05.

21. The process of claim 17 wherein a weight ratio of carbon content of solid ash to carbon content of carbonaceous material feed is less than about 0.01.

22. The process of claim 17 wherein carbon content of said solid ash is less than about 10 weight %.

23. The process of claim 17 wherein carbon content of said solid ash is less than about 5 weight %.

24. The process of claim 17 wherein mass of total oxygen per unit mass of total carbon in carbonaceous material feed entering gasification zone is less than mass of total oxygen per unit mass of total carbon in unconverted portion of carbonaceous material feed entering burn-up zone.

25. The process of claim 17 wherein the gasification zone includes one or more gasification hearths.

26. The process of claim 17 wherein the burn-up zone includes one or more burn-up hearths.

27. The process of claim 25 wherein one or more of said gasification hearths accomplish preheating of said carbonaceous material by heat exchange with one or more of said first gaseous product and second gaseous product.

28. The process of claim 17 wherein said carbonaceous material is selected from the group consisting of carbonaceous material, carbonaceous liquid product, carbonaceous industrial liquid recycle, carbonaceous municipal solid waste (MSW or msw), carbonaceous urban waste, carbonaceous agricultural material, carbonaceous forestry material, carbonaceous wood waste, carbonaceous construction material, carbonaceous vegetative material, carbonaceous industrial waste, carbonaceous fermentation waste, carbonaceous petrochemical co-products, carbonaceous alcohol production co-products, carbonaceous coal, tires, plastics, waste plastic, coke oven tar, fibersoft, lignin, black liquor, polymers, waste polymers, polyethylene terephthalate (PETA), polystyrene (PS), sewage sludge, animal waste, crop residues, energy crops, forest processing residues, wood processing residues, livestock wastes, poultry wastes, food processing residues, fermentative process wastes, ethanol co-products, spent grain, spent microorganisms, and mixtures thereof.

29. The process of claim 17 wherein ratio of total amount of molecular oxygen contained in the first molecular oxygen containing gas and the second molecular oxygen containing gas to the total amount of molecular oxygen required to completely oxidize all carbon contained in carbonaceous material feed to carbon dioxide is in a range of 0.1 to 0.9.

30. The process of claim 17 wherein molecular oxygen is introduced into the gasification zone and burn-up zone at a rate of about 0 to about 75 lb-mole per tone of carbonaceous material on a dry basis.

31. The process of claim 17 wherein a temperature of the gasification zone and burn-up zone is not greater than 800° C.

32. The process of claim 17 wherein a temperature of the tar destruction zone is greater than about 900° C.

* * * * *